Jan. 11, 1927.  G. E. NERNEY  1,613,765
EYEGLASS CONSTRUCTION
Filed August 29, 1924
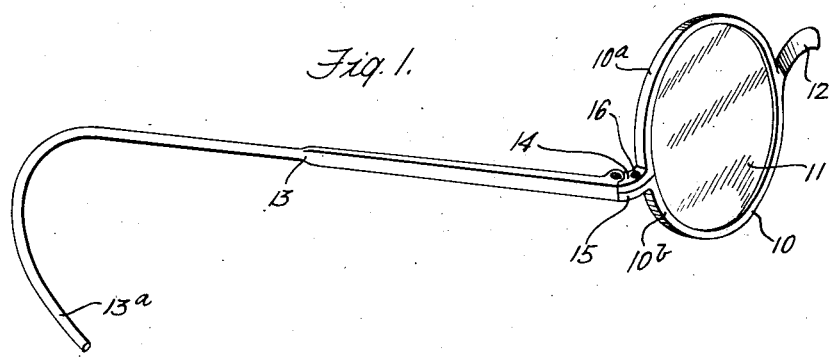
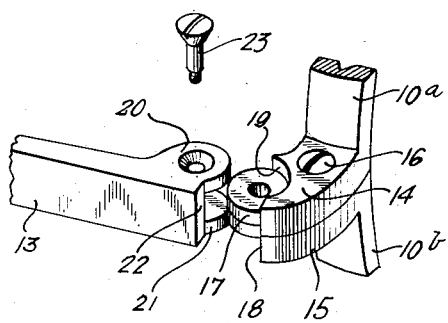
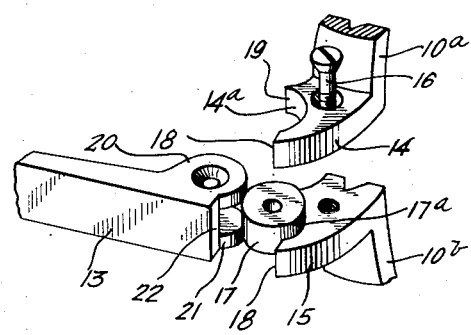
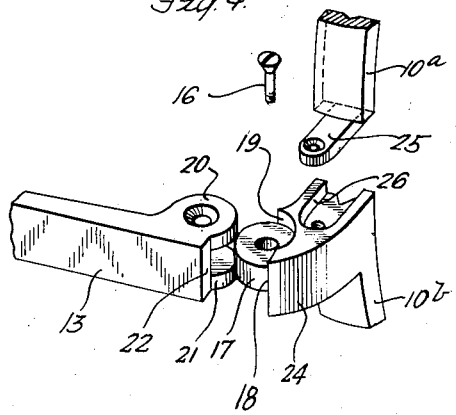
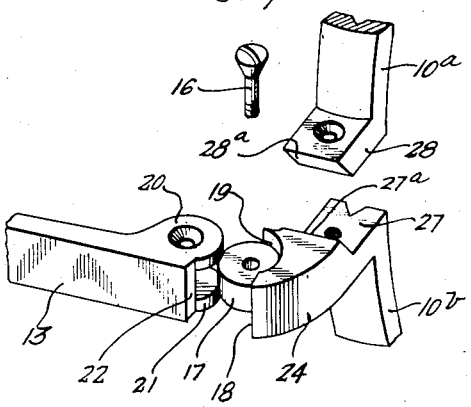
INVENTOR
George E. Nerney
BY Robert L. Blair
ATTORNEY Patented Jan. 11, 1927.

1,613,765

UNITED STATES PATENT OFFICE.

GEORGE E. NERNEY, OF ATTLEBORO, MASSACHUSETTS, ASSIGNOR TO BAY STATE OPTICAL COMPANY, A CORPORATION OF MAINE.

EYEGLASS CONSTRUCTION.

Application filed August 29, 1924. Serial No. 734,847.

This invention relates to eyeglass construction and more particularly to eyeglass frames and temple bar connections therewith.

One of the objects of the invention is to provide a construction of the above nature practical and efficient and capable of meeting the requirements of use in a highly satisfactory manner. Another object is to provide a construction of the above nature characterized by features of strength and rigidity, capable of dependable service without need of repair. Another object is to provide such a construction neat and attractive in appearance. Another object is to provide a construction of the above nature which is simple and wherein the parts are conveniently assembled or separated. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing, in which are shown various possible embodiments of this invention.

Figure 1 is a perspective of a portion of a pair of eyeglasses;

Figure 2 is a perspective of a connection between a temple bar and rim, the parts being shown separated from one another;

Figures 3, 4 and 5 are views similar to Figure 2, showing modified forms of the construction.

Similar reference characters refer to similar parts throughout the several views of the drawing.

Referring now to the drawing in detail, there is shown in Figure 1 one side of a pair of eyeglasses or spectacles comprising a rim 10 containing a lens 11, a bridge 12, and temple bar 13. The other half of the pair of eyeglasses is not shown in order to avoid unnecessarily encumbering the drawing, and it will be understood that the parts thereof are substantially indentical with those shown. The eyeglass rim 10 which is of metal is split at its side adjacent the point where the temple bar 13 is joined thereto. The two approaching end portions $10^a$ and $10^b$ of the rim are provided with laterally projecting and abutting end pieces 14 and 15, respectively. These end pieces are firmly secured together, preferably by means of a screw 16 passing through the upper end piece 14 and threaded into the lower end piece 15, whereby the two ends of the rim 10 are joined and the lens 11 secured in place within the rim. These two end pieces 14 and 15 thus abutting and secured together form in effect a lug projecting laterally from the side of the eyeglass rim. Upon this lug is pivotally mounted the forward end of the temple bar 13, as will be more fully described.

Referring now to Figure 2, the parts just described are shown in larger detail and with the temple bar moved away from its connection with the rim. As clearly shown in this figure, the end members 14 and 15 are preferably shaped to curve around rearwardly to some extent in a direction to meet the forward end of the temple bar 13. For the sake of clearness, it may be here noted that by the term rearwardly is meant a direction rearwardly along the temple bar toward the ear-piece $13^a$, forwardly being in the opposite direction, and that by the inner side of the temple bar or other parts is meant the side toward the face of the wearer, the outer side being employed to denote the side remote from the face of the wearer. As is seen in Figure 2, the inner side portion of the lug formed by the abutting end members 14 and 15, at the end portion 17 thereof, is rounded and projects beyond the end 18 of the outer portion of the lug. The portion 17 forms a bearing for the temple bar 13 and is undercut or recessed in rounded form, as indicated at 19 at both its top and bottom surfaces.

The temple bar 13 is preferably of metal, and is shown as of rounded form at its rear portion and of a flattened form at its forward portion adjacent its connection with the rim. At the forward end of the temple bar are formed a pair of spaced inwardly projecting parts 20 and 21 in the nature of flanges or ears. These ears are preferably formed integrally with the metal of the temple bar, being stamped out therewith and bent over or struck up from the inner surface of the temple bar. These flanges or ears 20 and 21 embrace the part 17 of the rim. They project inwardly and forwardly of the end 22 of the main body of the temple bar, and are rounded in contour to mate with the rounded walls of the undercut parts 19. These undercuts or recesses are of such a depth that the outer surfaces of the ears 20 and 21 are respectively substantially flush with the top surface of the end piece 14 and the bottom surface of the end piece 15. A pivot screw 23 passes through the part 20 and through the part 17, and is threaded into the part 21, pivotally connecting the temple bar with the eyeglass rim.

The temple bar 13 is thus pivotally mounted by means of the ears 20 and 21 embracing the rounded bearing part 17. As the temple bar is swung outwardly upon its pivot to normal position in use, the end 22 of the temple bar abuts the shoulder 18 of the end pieces 14 and 15 limiting the outward swinging of the temple bar. As is shown in Figure 1, the parts in this position closely mate so that no unsightly gaps are present.

The construction described above is one which attains many practical and important advantages. The temple bar embracing both of the end pieces 14 and 15 is provided with a firm, dependable joint therewith, and there is no tendency to pry apart and separate the two end members. Rather, the two ears 20 and 21 of the temple bar tend to aid in holding the end members 14 and 15 snugly together, assisting the action of the screw 16. When the eyeglasses are in use, the joint is practically concealed, so that the construction presents an attractive appearance. By removing the pivot screw 23 and the screw 16, the parts may be separated and the eyeglass rim spread for the removal or insertion of a lens.

Referring now to Figure 3, there is shown a slightly modified form. The construction disclosed in this figure is substantially the same as that of Figure 2, except that the bearing portion 17 embraced by the ears 20 and 21 of the temple bar is formed integrally with one only of the end members of the rim, for example, the end member 15. The curved surface 14$^a$ of the end member 14 mates with the forward surface 17$^a$ of the bearing member 17, and the screw 16 holds the two ends of the rim together. With this construction, as with the construction shown in Figure 2, it will be seen that there is no tendency for the temple bar, due to its connection with the rim, to pry the two ends of the rim apart. Moreover, with the construction shown in Figure 3, the rim ends may be separated for insertion or removal of a lens, simply by removal of the screw 16 without in any way interfering with the connection of the temple bar. The parts are rigidly held together, the engagement of the curved surface 14$^a$ of the end piece 14 with the surface of the bearing 17 lending to the strength of the structure.

In Figure 4 there is shown another form of connection. In this construction, one of the ends of the rim, such as the end 10$^b$, is provided with a heavier end piece 24, which is of substantially the combined proportions of the two end pieces 14 and 15 above described. The bearing member 17, embraced by the ears 20 and 21 of the temple bar 13, is integral with the end piece 24, and the top and bottom surfaces of the end piece are recessed or undercut, as at 19, to accommodate the flanges or ears of the temple bar. The end 10$^a$ of the eyeglass rim is provided with a projecting member 25 which is received in a recess 26 in the upper surface of the end piece 24. A screw 16 passing through the part 25 and threaded into the end piece 24 secures the ends of the rim together. In this construction, also, the eyeglass rim and the temple bar are connected by a firm, dependable joint which is substantially concealed, and there is no tendency for the temple bar to pry apart the ends of the rim. Moreover, in this construction, as well as that of Figure 3, the eyeglass rim may be spread for the insertion or removal of the lens without interfering with the mounting of the temple bar.

The construction shown in Figure 5 is the same as that of Figure 4, except for the connecting means between the rim end 10$^a$ and the lug 24. In this instance, the surface of the lug 24 is cut away as indicated at 27, and the rim end 10$^a$ is provided with a flange or end piece 28 adapted to be received in this cut portion 27 and rest therein substantially flush with the surface of the lug 24. To facilitate assembly of the parts, and to strengthen the structure, the piece 28 is preferably provided with a sloping end 28$^a$ mating with a sloping wall 27$^a$ of the cut portion 27. The screw 16 passing through the part 28 and threaded into the lug 24, holds the two ends of the rim together. In this construction, also, the rim may be spread without interfering with the mounting of the temple bar.

From the above, it will be seen that there are herein provided eyeglass constructions which embody the features of this invention and attain the objects thereof, including many important practical advantages.

As many possible embodiments may be made of the above invention and as many changes might be made in the embodiment above set forth, it is to be understood that all matter hereinbefore set forth is to be interpreted as illustrative and not in a limiting sense.

I claim as my invention:

1. In eyeglass construction, in combination, a temple bar having a substantially squared forward end and a pair of spaced ears extending inwardly adjacent said forward end, and a split rim having a pair of end members resting one against the other and forming a lug projecting outwardly from the side of the rim and curved rearwardly at its outer end, said lug terminating at its rear end in an inner bearing portion of reduced thickness which is embraced by said ears of said temple bar and an outer rearwardly facing squared portion against which said squared forward end of said temple bar is adapted to rest, a pivot screw for said temple bar passing through one of said ears, through said bearing portion and threaded into the other of said ears, and a connecting screw for said two end members passing through one thereof and threaded into the other thereof and positioned at a point between said bearing portion and said rim.

2. In eyeglass construction, in combination, a split eyeglass rim having a pair of end members projecting outwardly from the ends thereof and curved rearwardly and resting one upon the other, the upper end member having its top surfaces recessed from the rear end thereof and the lower end member having its bottom surface correspondingly recessed, the portions of said end members exterior of said recesses forming a rearwardly facing squared shoulder, a connecting screw passing through said end members at a portion thereof between said recesses and the rim, a temple bar having a substantially squared forward end mating with said rearwardly facing shoulder and a pair of spaced ears embracing said two end members and resting respectively in said recesses, and a pivot screw passing through one of said ears, through said recessed portions of said end members and threaded into the other of said ears, said recesses being of a depth substantially equal to the thickness of said ears so that the outer surfaces of said ears rest substantially flush with the corresponding surfaces of said end members.

In testimony whereof, I have signed my name to this specification this twenty-first day of August, 1924.

GEORGE E. NERNEY.